United States Patent Office 3,422,919
Patented Jan. 21, 1969

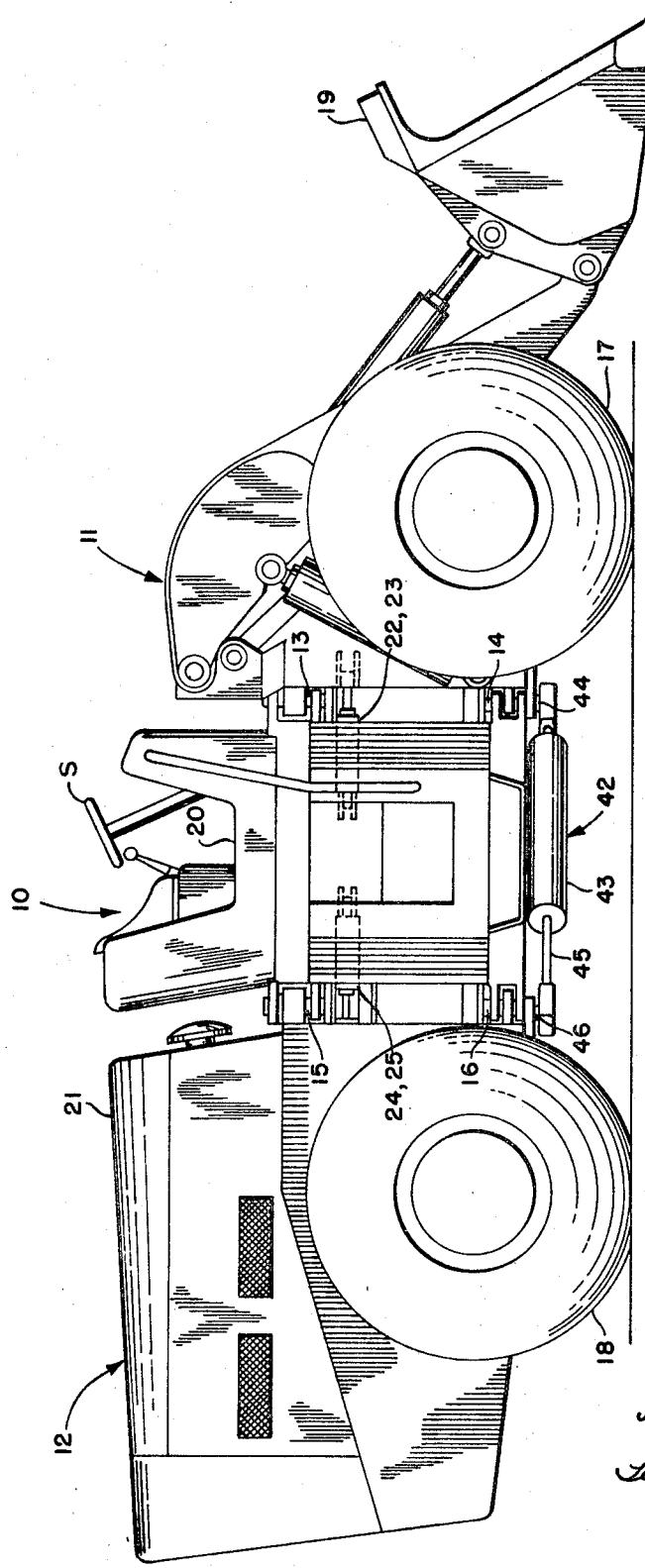

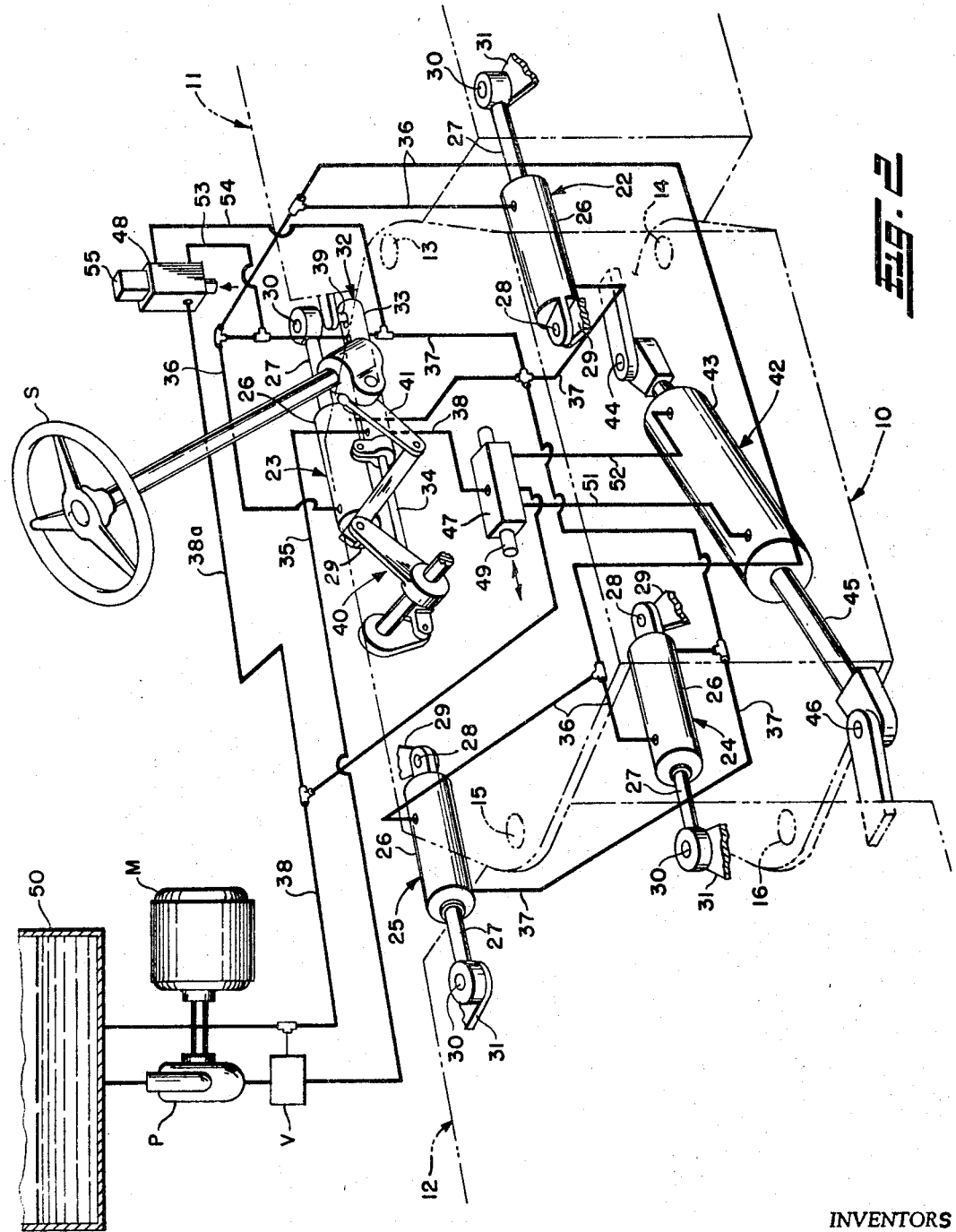

3,422,919
ARTICULATED VEHICLE STEERING
Lloyd A. Molby, Elba, N.Y., and James C. White, Jr., Louisville, Miss., assignors to Eaton Yale & Towne Inc., Cleveland, Ohio, a corporation of Ohio
Filed May 4, 1966, Ser. No. 547,583
U.S. Cl. 180—79.2                    12 Claims
Int. Cl. B62d 5/06; F15b 15/18

ABSTRACT OF THE DISCLOSURE

The forward and rearward end units of a double articulated tractor shovel vehicle are steered relatively to the central unit by hydraulic steering rams that are connected hydraulically in parallel and a link in the form of a further hydraulic ram is connected in a diagonal position between the end units. The three units of the vehicle are connected by pivots that hold them against twisting in a longitudinal axis, and the diagonal ram normally is locked hydraulically so as to act as a solid link, thus coordinating the movements of the two end units while steered by the steering rams. There is a hydraulic system that can actuate the diagonal ram while certain steering rams float, so that the vehicle may have steering movements of different types, including "crab" steering.

---

This invention relates to an articulated vehicle particularly adapted for use as a shovel loader, although capable of other uses as those skilled in the art will appreciate. More particularly, our invention is an improvement on the vehicle that one of the present inventors, Lloyd A. Molby, has disclosed in his earlier application Ser. No. 397,400, filed Sept. 18, 1964, entitled, Double Articulated Tractor Shovel, which now is Patent No. 3,305,039 dated Feb. 21, 1967.

In the vehicle shown in the earlier application, there is found a central unit relatively to which are pivoted forward and rearward traction units, these units effecting steering through swinging about their pivots. The traction units contribute each a considerable part of the length of the vehicle, and all of the units together form an articulated vehicle body, with the pivots arranged in position remote from the axes of ground engaging wheels on the tractor units. In the preferred construction, the swinging of the traction units is accomplished through the utilization of hydraulic rams. Preferably also, two of the hydraulic steering rams are positioned symmetrically between the central unit and each of the two traction units. The four steering rams are arranged symmetrically not only relatively to the longitudinal axis of the vehicle formed by the three units, but also relatively to a transverse axis. Further, by effectively relating the steering rams hydraulically, those rams will swing the two traction units in symmetrical relation to the central unit so as to stabilize the vehicle for the handling of loads.

While the mechanism described in the earlier application is very effective, we have found that we can simplify the mechanism by utilizing a link that is pivoted to the front and rear units, but that is left completely free of any relation to the central unit. More particularly, we pivot one end of the link to the forward unit at one side of the pivot between that unit and the central unit. The other end of the link is pivoted to the rear unit, but at that side of the pivot between the rear and central units which is opposite the pivot between the link and the forward unit. That places the link in angular relation to the longitudinal axis of the vehicle, coordinating the steering movements of the several rams and balancing the movements between the forward and rear units of the vehicle. Moreover, the link will fully control the position of the central unit, stabilizing it relatively to the end units.

As a more particular feature of our invention, the link that connects the front and rear end units takes the form of a hydraulic ram. When the opposed ends of this ram are closed against the effective flow of fluid, the ram becomes the equivalent of a rigid link and will function to contribute effective steering movement of the end units of the vehicle relatively to the central unit, and of the end units relatively to one another.

As a still further feature of the invention, we utilize a valving mechanism that makes it possible to move the two steering rams located between one of the end units and the central unit, while simultaneously moving fluid to the ram that constitutes the link between the two end units. Through this action, the particular end unit can be moved laterally relatively to the remainder of the vehicle, as will be made more apparent hereinafter. The particular concept makes it possible to spot the vehicle relatively to a load in a most desirable manner. That will be a considerable advantage, more especially when the vehicle is a shovel loader that must position a load handling bucket relatively to a load.

It will, therefore, be appreciated by those skilled in the art, that through the novel contribution generally herein set forth, we are not only able to bring about effective steering of our vehicle through the use of the rigid link of our invention, but we are able, through the utilization of the hydraulic construction of that rigid link, to bring about a further orientation of the units of the vehicle, so that it may be effectively positioned relatively to a load without requiring the amount of maneuvering that is necessary in standard vehicles now known in the art.

We have thus outlined rather broadly the more important features of our invention in order that the detailed description thereof that follows may be better understood, and in order that our contribution to the art may be better appreciated. There are, of course, additional features of our invention that will be described hereinafter and which will form the subject of the claims appended hereto. Those skilled in the art will appreciate that the conception on which our disclosure is based may readily be utilized as a basis for the designing of other structures for carrying out the several purposes of our invention.

Referring now to the drawings:

FIG. 1 shows a side view of an articulated loader that utilizes our invention.

FIG. 2 shows a diagrammatic view of the steering system of the loader.

So that our invention may readily be understood, we show in FIG. 1 of the drawings a shovel loader much like the one that forms the subject of the earlier application to which we have referred. Thus, the loader has a body that includes a central control body unit 10, and opposed front and rear end body units 11, 12 that are connected to the central unit 10 through pairs of vertical pivot pins 13, 14 and 15, 16. Those pairs of pivot pins are positioned in the longitudinal axis of the loader, and are so mounted that their axes are held in fixed relation to the units they connect. With pivot pins 13, 14 and 15, 16 mounted in that way, the body units 10, 11, 12 cannot twist in a longitudinal axis relatively to one another. The end units 11, 12 are equipped with pairs of wheels 17, 18 forming the front and rear wheels of the loader, merely those wheels which are at one side of the loader being visible in FIG. 1. A loading bucket 19 is mounted for lifting movement on the front unit 11, and there is an operator's platform 20 equipped with a steering wheel S on the central unit 10. An engine that furnishes power for the loader is mounted in a compartment 21 on the rear end section 12.

As best shown in FIG. 2, a front pair of steering hydraulic rams 22, 23, extends between the front end unit 11 and the central unit 10 for swinging unit 11 about its pivot pins 13, 14 so as to steer the loader. Similarly, a rear pair of steering rams 24, 25 will steer the rear end unit 12 about its pivot pins 15, 16. Each of the steering rams includes a ram cylinder 26 and a piston 27 that will extend and retract when fluid pressure is applied through ports in either end of the cylinder. The cylinder 26 of each steering ram is connected through a pivot 28 to a bracket 29 on the central unit 10, and each piston 27 is connected through a pivot 30 to a bracket 31 on the corresponding end unit 11 or 12. All of the pivots 28 and 30 are so positioned that steering rams 22, 23, 24, 25 are in symmetrical relation to the units 10, 11, 12 and to the pivots 13, 14, 15, 16 between the units. Thus, the rams act at symmetrical points to control the swinging of the end units of the loader.

Referring again to FIG. 2, we utilize in our invention a steering valve, indicated generally by the numeral 32, which may be of a standard type like that described in the earlier Molby application. For the purposes of disclosure we shall indicate that the steering valve 32 in effect is a four-way valve including a cylinder 33 and a valve piston 34. By sliding relatively to each other the cylinder and piston will direct fluid pressure from a high pressure line 35 to either of two lines 36, 37, while directing fluid from the other of the two lines 36, 37 to a low pressure line 38. In a neutral position, valve 32 will connect the high pressure line 35 directly to low pressure line 38 while blocking flow relative to each line 36, 37.

Valve cylinder 33 is connected through a ball joint 39 to the front end unit 11 of the loader, and piston 34 is connected through linkage 40 to a lever 41 that forms a part of the steering apparatus operated by steering wheel S on the central unit 10. The operator of the loader may then utilize steering wheel S to operate steering valve 32, but with the valve movements controlled further through steering movement of the front end unit 11 above its pivots 13, 14. Of course, it will be appreciated that in many respects the construction we have thus far described is like that which is shown in the earlier application. Here, however, we do not require two steering valves, and we merely need use the single steering valve 32. We now shall describe particularly the novel contribution of our invention.

First, we call attention to the fact that we connect a branch of the line 36 to a particular end of the cylinder 26 on each of the steering rams 22, 23, 24, 25. We connect a branch of the line 37 to the opposed end of each cylinder 26. The connections are such that fluid pressure when applied through one of the lines 36, 37 will cause the steering rams to swing both end units 11, 12 in the same lateral direction about their pivots relatively to the unit 10. For example, pressure applied through line 37 will cause both end units to swing toward the left. Moreover, the steering rams 22, 23, 24, 25 are hydraulically parallel to one another, enabling the steering valve 32 to apply fluid pressure at the same time to all of the steering rams.

As shown in FIGS. 1 and 2, there is a further hydraulic ram 42 that forms a link between the front and rear end units 11, 12 of the loader. Ram 42 has a cylinder 43 connected by a pivot 44 to a part of one of the end units 11, 12, and a piston 45 connected through a pivot 46 to a part on the other end unit. Ram 42 has no direct connection to the central unit 10. It will be seen in FIG. 2 that pivot 44 is arranged on one side of the axis of pivots 13, 14 about which end unit 11 articulates, while pivot 46 is arranged on the opposed side of the pivots 15, 16 of unit 12. That normally places the linking ram 42 in angular relation to the longitudinal axis of the loader.

As a preferred means for controlling the linking ram 42, the hydraulic system of the loader includes a diverter valve 47 and a dump valve 48. The diverter valve 47 may be of a standard type that has a normally open center, and a spool 49 that can be moved to divert fluid pressure to either of two lines while accepting fluid of the other of two lines. In a neutral position, spool 49 will block each of said two lines. When utilized in our invention, diverter valve 47 will be so inserted in the low pressure line 38 that the normally open center of the valve will allow fluid to move freely from steering valve 32 through a line 38 to a reservoir 50. Also, diverter valve 47 is connected through lines 51, 52 to opposed ends of the link ram cylinder 43. Valve spool 49 when in neutral position will block lines 51, 52, thus locking the linking ram 42 against extending and retracting movement, and ram 42 then will be a solid link in effect.

By actuating the diverter valve 49, it will be possible to direct through one of the lines 51, 52 the pressure that may flow in line 38, whereby to extend and retract the linking ram 42. We have referred to line 38 as a low pressure line merely because that line connects steering valve 32 to reservoir 50, but it is to be understood that high pressure may act in a part of line 38 when the valve spool 49 diverts the flow that normally goes to the reservoir.

The dump valve 48 is connected through lines 53, 54 to the lines 36, 37, and through a line 38a to line 38 and the reservoir 50. Dump valve 48 has a normally closed center blocking the lines 53, 54, enabling steering valve 32 to control pressures in the lines 36, 37 and thereby to control normally the operation of steering rams 22, 23, 24, 25. When dump valve 48 is actuated, as through a solenoid 55, that valve will place both lines 53, 54 in communication with line 38a, thus relieving all fluid pressure in lines 36, 37 so that the steering rams will be free flowing and will not oppose swinging movements of end units 11, 12 on the loader.

We have not referred to a particular source of fluid pressure for the pressure line 35 because that source may be conventional. For example, there may be a pump P, FIG. 2, that is supplied from reservoir 50 and that is driven by a motor M so as to apply high pressure to line 35. A pressure regulating valve V may be inserted in line 35.

We shall now describe the operation of our novel articulated vehicle. Let us assume that the dump valve 48 is in a normal position blocking lines 53, 54, enabling lines 36, 37 to accept fluid pressure that may be applied to them. Assume also that the diverter valve 47 is in position blocking lines 51, 52 whereby to lock linking ram 42 against extending and retracting movement. The sole steering valve 32 now will control steering rams 22, 23, 24, 25 and the operator may utilize steering wheel S to operate valve 32 and thereby to swing the end units 11, 12 and their wheels 17, 18 to steer the vehicle. As will be understood, the actual steering movements of the end units 11, 12 will apply further control to steering valve 32, acting through ball joint 39 to move the valve automatically to neutral position as the steering is accomplished.

It will be remembered that steering rams 22, 23, 24, 25 are parallel hydraulically, and therefore valve 32 will apply fluid pressures at the same time to all of the steering rams. Further, the steering rams 22, 23, 24, 25 act at symmetrical points on the units 10, 11, 12 of the vehicle. Thereby the steering rams may contribute smooth and effective steering of the two end units 11, 12, but to fully understand the effectiveness of the steering, it is necessary to consider the linking ram 42, which at this time is acting as a solid link.

The ram 42, which for the moment we may call a link, will so coordinate the movements of the two end units 11, 12 that those units will swing at the same time about their pivot axes. The link 42 also will stabilize the movements of the central unit 10, that unit tending to be unstable in a lateral direction due to the fact that pivots 13, 14 and 15, 16 are remote from the axes of the ground engaging wheels 17, 18. We might indicate that we prefer to locate each of the link pivots 44, 46 in the same relation to the corresponding pivot axis 13, 14, or 15, 16, so that end units 11, 12 will swing through equal angles. However, it is conceivable that some persons may prefer that units 11, 12 move at different rates while swinging simultaneously, and therefore we do not wish to be limited to the particular relation between each link pivot and the pivot of its corresponding unit. It is merely important here to know that link 42 will coordinate swinging of the two units 11, 12. The steering rams 22, 23, 24, 25 then need accept none of the forces that may be necessary to coordinate the steering of the opposed ends of the vehicle. Thereby it is possible to distribute the steering forces among all of the steering rams 22, 23, 24, 25, achieving extremely uniform and effective steering. Moreover, we can utilize smaller steering rams.

If we assume that the operator wishes the vehicle to move in an angular direction, with what we may call a crab movement, he will first actuate the dump valve 48 through suitable means, not shown. Lines 53, 54 now are open through valve 48 to reservoir 50, so that lines 36, 37 will not retain pressure. Therefore, steering rams 22, 23, 24, 25 are free flowing. The operator now may actuate the spool 49 of diverter valve 47 in one direction or the other. The pressure which flows from high pressure line 35 through steering valve 32 and line 38 now will be directed through one of the lines 51, 52. That will cause the link ram 42 to extend or to retract, tending to shift both end units 11, 12 and their wheels 17, 18 in the same angular direction, or in other words in opposed lateral directions relatively to the central unit 10. Thereby the link ram 42 will actually change the normal steering relation between the end units 11, 12. When the units 11, 12 are in the relation that the operator wishes, he will move diverter valve 47 and dump valve 48 again to their normal positions. That will hydraulically lock the link ram 42, and will place steering valve 32 again in control of the steering rams 22, 23, 24, 25. Thereafter, the steering wheel S can be utilized to steer the vehicle, but with the vehicle now moving in a generally lateral direction, or crabwise. Since steering valve 32 will control all of the steering rams, it will be appreciated that there is only one valve that the operator need operate while steering the vehicle, whether it be steered normally or crabwise.

As we have indicated, our invention will be particularly useful when the vehicle is a shovel loader. Thus, a shovel loader frequently must operate on uneven ground, and much of the time will move in a rearward direction. Under those conditions our invention will enable a shovel loader to be easily maneuvered, and will allow the operator very readily to spot the loader bucket in positions for loading and dumping. Moreover, to a considerable extent, the placing of the bucket will be facilitated by the lateral shifting of the front end unit of the loader, as is possible through our invention.

The particular hydraulic arrangement that we have described is one that operates very well and that we prefer. However, those who are skilled in the art may arrange other hydraulic details that will fall within the scope of our invention. It is merely necessary that the hydraulic system have a steering valve that may control steering rams while those rams are in hydraulically parallel relation and coordinated through a link. When that link is a hydraulic ram, there will be a further valve together with means that will enable certain steering rams to move during movements of the linking ram. Therefore, we do not wish to be limited by details of the hydraulic system that we have described.

We believe that the features and the operation of our novel articulated vehicle steering now will be understood, and that its advantages will be fully appreciated. Therefore, we believe that the very considerable merits of our invention will be understood by persons who are skilled in the art.

We now claim:

1. In a vehicle having a double articulated body in which there are a relatively short central body unit and two opposed end body units arranged longitudinally relatively to one another, each end body unit contributing a considerable part of the length of the vehicle and being equipped with ground engaging wheels, pivots positioned in steering axes that are remote from the axes of said wheels and connecting said end units symmetrically to said central unit, said pivots lying in the longitudinal axis of said vehicle when said three units are in longitudinal axis of said vehicle when said three units are in longitudinal alignment, said vehicle having steering means for steering said end units about their pivots relatively to said central unit, means mounting said pivots in position with their steering axes in fixed relation to the units they connect whereby to hold the units against twisting in a longitudinal axis while said units are steered, and said pivots tending by their position relatively to the wheel axes to make the central body unit unstable relatively to the end body units, the improvement that comprises a link arranged between said end units of the vehicle, and means pivoting the ends of said link to points located on said end units symmetrically at opposed sides of the pivots that connect the units whereby to contribute stability to said central unit while compelling related steering of said end units relatively to one another and to said central unit.

2. In claim 1, the feature that said link and steering means are in the form of hydraulic rams, and valves for rendering said rams operative and inoperative to control the positioning of said units relatively to one another.

3. In claim 1, the feature that said link and steering means are in the form of hydraulic rams, and valves for relieving at least certain of said steering rams from hydraulic pressure while applying hydraulic pressure to said hydraulic ram forming said link, whereby to effect shifting of said units relatively to one another.

4. In claim 1, the feature that said steering means comprise two hydraulic rams extending between the central unit and each of said end units, all four of said rams being pivoted to said units at points that are symmetrical as to said units and to the pivots connecting the units whereby to effect symmetrical steering of said end units relatively to said central unit.

5. In claim 1, the feature that said steering means comprise two hydraulic rams extending between the central unit and each of said end units, all four of said rams being pivoted to said units at points that are symmetrical as to said units and to the pivots connecting the units whereby to effect symmetrical steering of said end units relatively to said central unit, a hydraulic ram forming said link, and valve means for relieving at least certain of said steering rams from hydraulic pressure while applying hydraulic pressure to said hydraulic ram forming said link, whereby to effect other than steering shifting of said units relatively to one another.

6. In a double articulated vehicle of the class having a central unit and two opposed end units, pivots connecting said end units symmetrically to said central unit, said pivots lying in the longitudinal axis of said vehicle when said three units are in longitudinal alignment, and said vehicle having steering means for steering said end units about their pivots relatively to said central unit, the improvement that comprises a link arranged between said end units of the vehicle, means pivoting the ends of said link to points located on said end units symmetrically at opposed sides of the pivots that connect the units whereby to compel related steering of said end units relatively to one another and to said central unit, a hydraulic ram forming said link, and valve means for controlling the flow of fluid relatively to that ram to effect functioning of said ram as a rigid link.

7. In a vehicle having a double articulated body in which there are a relatively short central body unit and two opposed end body units arranged longitudinally relatively to one another, said central unit and end units having each a length contributing a considerable part of the length of the vehicle, each of said end body units being equipped with ground engaging wheels and having a portion in position considerably removed from the axes of the wheels and juxtaposed to the central unit, means on said juxtaposed portion of each end body unit mounting that unit for steering movement on one end of the central unit, comprising means holding each end unit against twisting in a longitudinal axis relatively to the central unit while the units are steered, said central body unit being supported on the juxtaposed portions of the end body units and tending to be unstable in a lateral direction due to the position of those portions remote from the wheel axes, a link having opposed ends pivoted to points on the two end units for coordinating the steering movements of one end unit relatively to the other end unit, a steering hydraulic ram extending between the central unit and each end unit of the vehicle, and means for directing fluid pressure to the steering rams whereby to steer both said end units while said link contributes stability to the central body unit.

8. A construction as set forth in claim 7, and including hydraulic lines applying simultaneously to all of the steering rams the fluid pressure that is directed to said rams, and in which said points to which the link ends are pivoted are located on opposite side portions of the respective end units of the vehicle.

9. A construction as set forth in claim 7, in which said means for directing fluid pressure to the steering rams include a circuit connecting said rams in hydraulically parallel relation whereby to apply the pressure to each ram simultaneously.

10. A construction as set forth in claim 7, in which said means for directing fluid pressure to the steering rams include a circuit connecting said rams in hydraulically parallel relation, said construction further including a hydraulic ram that forms said link, means for applying fluid pressure to extend and to retract said ram that forms the link whereby to shift one end unit of the vehicle relatively to the other end unit, and the parallel circuit relation between the steering rams permitting fluid to move between those rams when the link ram shifts one end unit of the vehicle.

11. A construction as set forth in claim 7, in which said means for directing fluid pressure to the steering rams include a steering valve operated by a steering wheel, and having means controlled by the steering movements of one end unit of the vehicle to block a flow of fluid relatively to the steering rams when said one end unit moves to a steered position that corresponds to the position of the steering wheel, and valve means for functionally disconnecting at least one of the steering rams relatively to said steering valve to allow one of the end units of the vehicle to be shifted on its mounting independently of the operation of said steering valve.

12. In a vehicle of the class described, a central unit, two opposed end units mounted for steering movement on opposed ends of said central unit and supporting said central unit, said central unit and end units having each a length contributing a considerable part of the length of the vehicle, and the mountings of the opposed end units comprising means holding said end units against twisting in a longitudinal axis relatively to the central unit while the units are steered, a pair of duplicate steering rams extending between each of said end units and said central unit with said rams symmetrically arranged relatively to the longitudinal axis of said units, a steering mechanism mounted on the central unit of the vehicle, a steering valve having a pair of parts that are relatively movable for controlling fluid pressure, means connecting said movable parts of the steering valve one to the steering mechanism and the other to one of the end units, so as to effect movement between the two parts of the steering valve when the steering mechanism is operated and also when said one end unit steers relatively to the central unit. hydraulic pressure lines interconnected between said steering valve and said steering rams to apply the pressure controlled by said valve parts simultaneously to all of said rams for swinging the end units of the vehicle on their steering mountings, a link having opposed ends pivoted to points on the two end units for coordinating the steering movements of one end unit relatively to the other end unit when steered by the pressure applied to the steering rams, a hydraulic ram forming said link and adapted to extend and to retract for shifting the end units relatively to each other on their steering mountings, and means for functionally disconnecting a pair of the steering rams from the pressure controlled by the parts of said steering valve whereby to enable said hydraulic ram to shift an end unit independently of the operation of said steering valve.

References Cited

UNITED STATES PATENTS

| 1,323,890 | 12/1919 | Manly. | |
|---|---|---|---|
| 2,494,324 | 1/1950 | Wright | 180—51 X |
| 2,598,863 | 6/1952 | Tucker | 180—50 |
| 3,305,039 | 2/1967 | Molby | 180—51 |

FOREIGN PATENTS

| 1,077,558 | 5/1954 | France. |
|---|---|---|
| 564,377 | 3/1934 | Germany. |

BENJAMIN HERSH, *Primary Examiner.*

J. A. PEKAR, *Assistant Examiner.*

U.S. Cl. X.R.

60—52